United States Patent Office 3,471,284
Patented Oct. 7, 1969

3,471,284
DIRECT PRODUCTION OF METAL CARBIDES AND METALS FROM ORES
Philippe D. S. St. Pierre, Birmingham, Mich., assignor to General Electric Company, a corporation of New York
No Drawing. Filed Aug. 7, 1967, Ser. No. 658,640
Int. Cl. C22b 57/00; C01b 31/34; C01g 41/00
U.S. Cl. 75—84          12 Claims

ABSTRACT OF THE DISCLOSURE

Refractory metal carbides and refractory metals, specifically tungsten, tantalum or niobium carbide or the respective metal, can be produced by heating a mixture of silica, either calcium tungstate, calcium tantalate or calcium niobate, and a suitable reducing agent to cause a reaction resulting in the formation of dicalcium silicate slag and, depending upon the firing temperature and the kind and amount of reducing agent, either metal carbide or metal product.

---

The nature and extent of scientific and technological growth in recent years has resulted in special materials requirements. For example, the development of larger and more powerful gas turbine engines, supersonic aircraft and rockets has resulted in an increasing demand for materials capable of delivering high physical and chemical performances under extreme operating conditions. This in turn usually results in an urgent demand for new and better techniques for producing or recovering these materials from their ores in chemical and physical condition such that they can readily be put to these new uses.

Three metals which have relatively recently come into extensive use under severe operating conditions are tungsten, tantalum and niobium, the applications of tungsten presently being more diverse and extensive than those of either of the others. These metals all possess high melting points and are useful both in elemental form, particularly as alloys for high-temperature applications, and in the form of carbides for cutting tools and abrasives.

Prior to the present invention, the recovery of tungsten, tantalum and niobium from their respective ores was a relatively complex and expensive process involving a number of physical and chemical separating steps. Tungsten, for example, was usually recovered either from wolframite [(Fe, Mn)WO$_4$] or scheelite (CaWO$_4$) by smelting wolframite with soda or hydroxide or by decomposing scheelite with acid. Both procedures lead through a series of processing operations to a final pure metal recovery step. The carbide product is then obtained by reacting the pure metal with carbon in still another series of mixing and reacting steps.

It is a principal object of this invention to provide a new process for directly producing the carbide of tungsten, tantalum or niobium from calcium tungstate, calcium tantalate or calcium niobtate.

It is also an important object of this invention to provide a new method for the production of metallic tungsten from a tungsten ore having substantial advantages over the best prior art method.

Other objects and advantages of this invention will be in part obvious and in part explained by reference to the accompanying specification.

As outlined above, the process of this invention concerns the direct production of the carbides of tungsten, tantalum and niobium, and also the direct production of tungsten, in an easier and quicker and less complex way than has hitherto been known in the art. The process, broadly described, involves bringing together as active constituents silica, a material from the group consisting of calcium tungstate (CaO·WO$_3$) and calcium tantalate (xCaO·yTa$_2$O$_5$) and calcium niobate (xCaO·yNb$_2$O$_5$), and a solid or gaseous reducing agent in a predetermined amount sufficient to yield either the metal or the carbide, heating the resulting mixture to at least about 800° C. to obtain the metal or carbided metal product, cooling the resulting reaction mass and physically disintegrating the dicalcium silicate to a fine powder state, and separating and removing the desired metal or carbide product from the reaction mass.

Considering the process of this invention in more detail, the following equation represents the stoichiometric reaction of this process for the direct production of metallic tungsten:

(1) 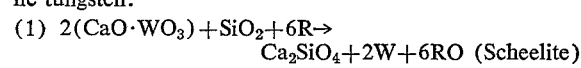

where R represents a reducing agent.

In the preceding equation, the letter R, as indicated, represents a reducing agent. This reducing agent can be gaseous at room temperature or under operating conditions, hydrogen, carbon monoxide, methane and kerosene being examples of this type. Alternatively, charcoal, coal, coke or other carbon form which remains in the solid state during this process may be used. In any event, any reducing agent capable of combining with the metal should be used in limited amounts approximating stoichiometric proportion to avoid possible contamination of the metal final product. Where hydrogen is employed as the reducing agent, there will be no limit in this sense because hydrogen will not react with the metal produced.

These reactions are carried out in an environment which is non-reactive with respect both to the materials to be reacted together and the desired products for otherwise there could be contamination and decreased yields. An argon atmosphere or a vacuum, for example, are suitable for carrying out this process.

Once having combined the necessary ingredients in the proper proportions, the mixture is heated to a temperature no lower than about 800° C. and generally no higher than about 1600° C. temperatures much higher than about 1600° C. are conducive to side reactions which limit the effectiveness of the reducing operation. The mixture temperature is held within this 800° C. to 1600° C. range for times sufficient to allow the reaction to go substantially to completion. As a general matter, times of from about 30 minutes to 6 hours will be adequate depending somewhat upon the size and geometry of charge present in the furnace where the reaction is being effected and the means of heating.

If it is desired to produce carbide rather than metal, and this may well be the more important application of the process, the reaction charges are prepared substantially along the lines indicated by the following equations:

(4)  2(CaO·WO$_3$)+SiO$_2$+8C→Ca$_2$SiO$_4$+2WC+6CO
(5)  2CaO·Ta$_2$O$_5$+SiO$_2$+7C→Ca$_2$SiO$_4$+2TaC+5CO
(6)  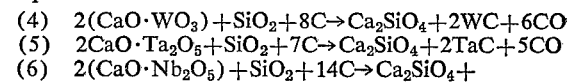

While the proportions of carbon used in Equations 4 to 6 represent stoichiometric amounts, it is preferred that some excess amount of carbon be present. Excess amounts as high as 20 percent effectively assist production of tungsten, tantalum or niobium carbides but it has also been found that the presence of larger excesses as above 50 percent over stoichiometry tend to lead to the formation of a glassy material which is difficult to separate from the desired carbide product. Conversely, if sufficient carbon is present, a lower tungsten carbide such as W$_2$C is formed which does not have the useful qualities of the carbide WC and, in addition, silica and scheelite tend to form a glass which complicates separation and recovery of the carbide product. The optimum amount of carbon for the production of tungsten carbide (WC) is indicated in the following equation:

(7) $2CaWO_4 + SiO_2 + 8.0 - 9.0C \rightarrow Ca_2SiO_4 + 2WC + 6CO + 0.0 - 1.0C$ Although it would appear from Equation 7 that the excessive carbon performs no function, I have found that the kinetics of the operation are enhanced in such a way that the best yields of tungsten carbide result from its presence.

After the ingredients have been combined roughly in the proportions set forth in Equations 4–7, the mixture is heated to a temperature no lower than about 800° C. and preferably no lower than about 1200° C. and held at such temperature for periods ranging from about 30 minutes to 8 hours. Then the completely reacted mass is cooled and the carbide reaction product is separated from the dicalcium silicate. This separation is facilitated by the fact that the dicalcium silicate is frequently self-disintegrating in that as it cools it undergoes a phase transformation accompanied by a large volume (about 9.5 percent) change and "falls" into a micron-size powder so that the entire mass is amenable to standard methods of separation. The silicate may be washed out with dilute hydrochloric acid. Soluble calcium chloride and a colloidal hydrated silica are formed. Provided the acid does not exceed 1 part concentrated hydrochloric to 2 parts water and the products are removed immediately, there is no danger of gelling. The resultant products may be finally washed in caustic soda and water.

Turning now to some specific examples of the process, a batch was made up by combining as active constituents 3840 grams of −200 mesh scheelite ($CaWO_4$) with 390 grams of silica (−325 mesh) and 623 grams of carbon in the form of lampblack. The materials were mixed in a double-paddle planetary mixer, although they may be mixed in a twin-shell blender or any other suitable conventional means. To assure thorough mixing and the right degree of contact, the materials may be ball-milled together. In the double-paddle planetary mixer, the addition of a small quantity of water helps to compact the mixture into small, dense pellets. This mixture of the constituents was then packed into a carbon crucible and heated. It is also possible to utilize crucibles made of other materials such as clay-graphite. The mixture was then heated in a gas-fired muffle furnace while nitrogen gas was flowed over the surface to protect against oxidation. Argon is as suitable in this application as nitrogen since both are non-reactive with respect to the materials being reacted. Further protection of the charge from oxidation was afforded by covering its surface with carbon felt pads, provision being made for the escape of carbon monoxide formed during the reduction step.

The temperature of the charge was then raised to 1400° C. and held for 2 hours. Upon cooling, the dicalcium silicate slag reaction product broke up due to phase transformation and the material was then further ground to −60 mesh for subsequent separation.

While many different methods of separation can be used to win the carbide from the slag, in this case it was recovered by a leaching operation involving treatment first with one part concentrated hydrochloric acid diluted with two parts water and then later washed with water. The time and temperature of leaching and quantity of acid used depends on the amount of slag to be removed and individual preference for speed. As a guide, approximately 2 cc. of concentrated hydrochloric acid are used for each gram of silicate known to be present. Enough liquid is used to ensure that the material is properly wetted and the slag reacts to form a collodial silicate and calcium chloride which are washed away with water together with any residual carbon associated with the carbide product. Removal of this latter material is particularly expedited by the presence of sulphonated naphthalene or other dispersants. The sulphonated naphthalene in the proportion of approximately one-tenth of the weight of residual carbon is added to the wash water, but the exact amount of dispersant is not critical since it is added simply as an acid and not as a reagent.

Residual colloidal hydrated silicate is removed by washing the tungsten carbide product in caustic soda solution, approximately 0.5 gram of NaOH being required per gram of dicalcium silicate present. The selection of strength of solution and quantity is a matter of economic and personal preference, provided enough is supplied to dissolve the silica. The clean carbide is then washed free from salts with water and dried, and may be ground to finer size than the roughly 6-micron diameter particle size prevailing in the product prepared in the manner just described.

In another similar operation, the procedure outlined above was followed with the exception that a 100-gram charge corresponding to the equation:

$$2CaWO_4 + SiO_2 + 8C \rightarrow Ca_2SiO_4 + 2WC + 6CO$$

was prepared and heated in a carbon tray to expedite the rate of heating. Although in small batches of this type full carburization is promoted by using an excess of carbon, only the stoichiometric quantity was employed in this run. Upon completion of the reaction, the materials were separated and tungsten carbide powder was recovered as in the foregoing case.

To test the effectiveness of the invention method in producing niobium and tantalum carbides, a charge was prepared according to the equation:

$$2CaO \cdot Ta_2O_5 + SiO_2 + 7C \rightarrow Ca_2SiO_4 + 2TaC + 5CO$$

The quantity of active constituents involved were 49.7 grams of calcium tantalate, three grams of silica and 8.4 grams of carbon. All the materials were −200 mesh and were mixed thoroughly in an alumina ball mill and then isostatically pressed at 30,000 p.s.i. to form a small log of about one-half inch diameter. The reactants were heated in argon to 1550° C. for one hour. A soft, easily pulverized product resulted and this was leached in 40 milliliters of diluted hydrochloric acid (one volume concentrated acid: two volumes water). After standing for one hour, the supernate was decanted and the residue thoroughly washed and then releached with 50 milliliters of caustic soda solution (0.5 gram per cc.). Following washing to remove any remaining silicate, the powder was dried and X-rayed and was found to be tantalum carbide by X-ray diffraction.

In still another operation like those described above, calcium tungstate ($CaWO_4$) was reacted with silica and a reducing agent in the form of a stream hydrogen, the mixture of silica and tungstate being maintained at a temperature of 800° C. for two hours. Upon cooling, a separation of the tungsten powder was made by acid and alkali leaching.

Although the present invention has been described in connection with preferred embodiments, those skilled in the art will understand that modifications and variations may be resorted to without departing from the spirit and scope of the invention. Such modifications and variations are considered to be within the purview and scope of the invention and the appended claims.

What I claim as new and desire to secure by Letters Patent of the United States is:

1. A process for producing tungsten, tantalum or niobium carbides from calcium tungstate, calcium tantalate or calcium niobate comprising,
   preparing a mixture having as active constituents
   (a) silica,
   (b) a material selected from the group consisting of calcium tungstate, calcium tantalate and calcium niobate, and
   (c) carbon,
   said constituents being present in amounts sufficient to form carbide, and heating the mixture to a temperature no lower than about 800° C. and up to about 1600° C. in an environment non-reactive therewith for a time sufficient to form carbide.

2. A process for producing tungsten carbide from calcium tungstate comprising,
preparing a mixture having as active constituents
(a) silica,
(b) calcium tungstate, and
(c) carbon,
said constituents being present in amounts sufficient to form tungsten carbide,
and heating the mixture to a temperature no lower than about 900° C. and up to about 1600° C. in an environment non-reactive therewith for a time sufficient to form tungsten carbide.

3. A process as defined in claim 2 wherein up to about 20 percent excess carbon is used to carry out the reaction.

4. A process for producing tungsten carbide from calcium tungstate comprising,
preparing a mixture having the following materials as active constituents in substantially the mole ratios indicated:
(a) $2CaWO_4$
(b) $SiO_2$, and
(c) 8.0 to 9.0 carbon,
heating the mixture to a temperature of from about 1200° C. to 1600° C. in a non-reactive environment for a time sufficient to form tungsten carbide.

5. A process for producing tungsten carbide from calcium tungstate comprising,
preparing a mixture having as active constituents calcium tungstate and silica,
and heating the mixture in a carbon-containing gas to a temperature of not less than about 900° C. and up to about 1600° C. for a time sufficient to form tungsten carbide, said calcium tungstate, silica and carbon-containing gas being present in amounts sufficient to form tungsten carbide.

6. A process as defined in claim 5 wherein the carbon-containing gas is CO.

7. A process as defined in claim 5 wherein the carbon-containing gas is $CH_4$.

8. A process for reducing calcium tungstate comprising,
preparing a mixture having as active constituents
(a) silica, and
(b) calcium tungstate,
and heating the mixture in the presence of a reducing agent to a temperature of not less than about 800° C. and up to about 1600° C. causing the calcium tungstate and silica to react and to form a dicalcium silicate slag and tungsten, said silica, calcium tungstate and reducing agent being present in amounts sufficient to form tungsten.

9. A process as defined in claim 8 wherein the reducing agent is particulate carbon and is intimately mixed with silica and calcium tungstate.

10. A process as defined in claim 8 wherein the reducing agent is a gas.

11. A process as defined in claim 8 wherein the constituents are all particulate and have a maximum particle size of not more than —200 mesh.

12. A process for producing tungsten metal comprising,
preparing a mixture having active constituents combined substantially in ratios indicated by the following equation:

$$2(CaO \cdot WO_3) + SiO_2 + 6R \rightarrow Ca_2SiO_4 + 2W + 6RO$$

where R represents a reducing agent, and heating the mixture in a non-reactive environment to a temperature of from about 800° C.–1600° C. to react the mixture in accordance with the reaction formula.

References Cited
UNITED STATES PATENTS

| | | | |
|---|---|---|---|
| 1,792,943 | 2/1931 | Terry | 23—208 |
| 2,529,778 | 11/1950 | McKenna | 23—208 |
| 2,535,217 | 12/1950 | Li et al. | 75—84 X |
| 2,829,962 | 4/1958 | Supiro | 75—84 |
| 3,106,456 | 10/1963 | Ripley | 23—208 |

CARL D. QUARFORTH, Primary Examiner

M. J. SCOLNICK, Assistant Examiner

U.S. Cl. X.R.

23—51, 208